(12) United States Patent
Englander (10) Patent No.: US 7,401,955 B2
(45) Date of Patent: Jul. 22, 2008

(54) LIGHT SHIELD FOR A VEHICLE MIRROR

(75) Inventor: Benjamin Englander, Jamaica, NY (US)

(73) Assignee: Rosco Incorporated, Jamaica, NY (US)

( * ) Notice: Subject to any disclaimer, the term of this patent is extended or adjusted under 35 U.S.C. 154(b) by 63 days.

(21) Appl. No.: 11/075,773

(22) Filed: Feb. 22, 2005

(65) Prior Publication Data

US 2006/0187669 A1    Aug. 24, 2006

(51) Int. Cl.
*F21V 33/00* (2006.01)
(52) U.S. Cl. .................. 362/494; 362/505; 362/506; 359/602
(58) Field of Classification Search .................. 362/478, 362/492, 494, 539, 496, 505, 506, 135, 144; 359/601–602, 478–479, 609, 611, 871
See application file for complete search history.

(56) References Cited

U.S. PATENT DOCUMENTS

| | | | | | |
|---|---|---|---|---|---|
| 1,488,986 | A | * | 4/1924 | Hood | 359/602 |
| 1,518,956 | A | * | 12/1924 | Beitman | 359/602 |
| 2,622,481 | A | * | 12/1952 | Triphahn | 359/507 |
| 2,649,839 | A | * | 8/1953 | Condon | 359/507 |
| 5,084,785 | A | * | 1/1992 | Albers et al. | 359/868 |
| 5,421,628 | A | * | 6/1995 | Nahm | 296/1.11 |
| 7,080,911 | B2 | * | 7/2006 | Schmidt et al. | 359/602 |
| 2002/0089753 | A1 | * | 7/2002 | Englander | 359/603 |

* cited by examiner

*Primary Examiner*—Thomas M Sember
(74) *Attorney, Agent, or Firm*—Ostrolenik, Faber, Gerb & Soffen LLP (57) ABSTRACT

A vehicle mirror system includes a mirror unit which is held in space and supported above the front fender of the vehicle by support arms, the distal end of which is connected to the vehicle fender by suitable bracketry. The mounting bracketry is also utilized to affix and hold in place a visor which has a portion that extends generally between the headlight of the vehicle and the mirror unit to prevent at least a substantial portion of stray light from the headlight from reaching the mirror unit.

11 Claims, 9 Drawing Sheets

LIGHT SHIELD FOR A VEHICLE MIRROR

BACKGROUND OF THE INVENTION

The present invention relates to a vehicle mirror, and more particularly to a shield or visor for preventing light from a vehicle headlight or headlight cluster of lights from reaching the mirror.

Figure 1:
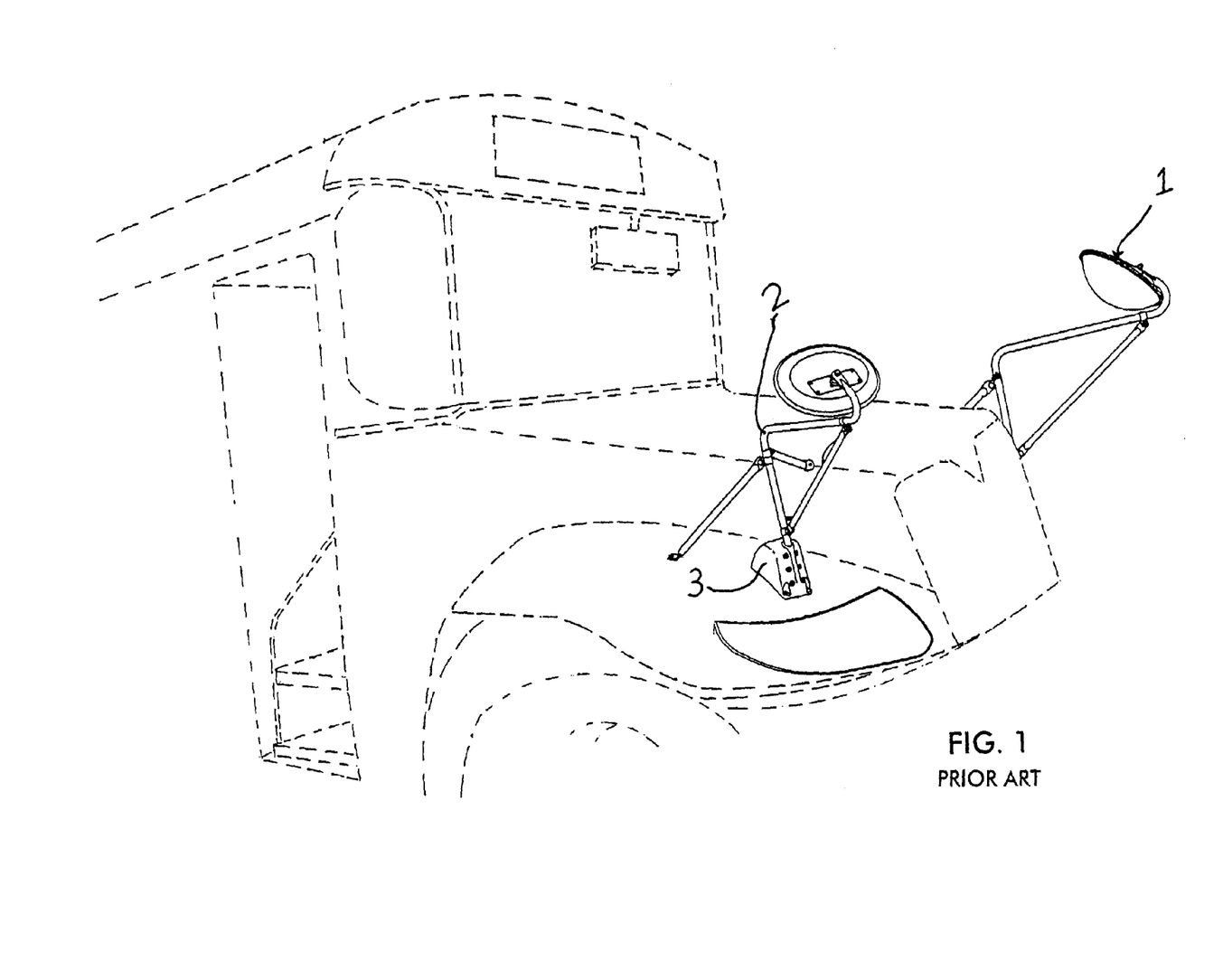
FIG. 1 shows a prior art mirror mounted on a bus.

Motor vehicles, in particular larger vehicles such as buses, trucks and the like, require an array of mirrors mounted on exterior surfaces of such vehicles in order to improve the visibility and field of view of the driver in and around the vehicle. Typically, an automotive mirror element has attached to it a staff or pole and that pole is secured within a mount which is in turn attached to the body of the vehicle. One type of mirror is a parabolic or cross-view mirror that is traditionally used on school buses to permit the driver to see directly in front of the bus as well as to the side, which would normally not be visible without the aid of such a mirror. Such a mirror is illustrated in FIG. 1. As seen in FIG. 1, a cross-view mirror is mounted at the foremost corners of the vehicle. A drawback associated with these types of cross-view mirrors is that with aerodynamically designed headlights as shown in FIG. 1, there is the possibility of light from the headlight being reflected in the mirror.

SUMMARY OF THE INVENTION

Accordingly, it is an object of the present invention to provide a shield or visor that attaches to the mirror mount and fender so as to block, deflect or hinder light from the vehicle headlight from reaching the mirror.

Pursuant to this object, and others which will become apparent hereafter, one aspect of the present invention resides in a visor for a mirror which is attached to the mounting brackets that attach the mirror to the vehicle body. The visor is configured to project at least partially over at least a portion of a headlight of the vehicle so as to block light leaving the vehicle from reflecting off the mirror.

The visor can be made of any suitable material, such as plastic or metal.

In another embodiment of the invention, the visor is mounted between the vehicle body and the mounting bracket of the mirror so as to form a gasket in addition to providing the light blocking function.

The visor, in a further embodiment of the invention, has an upper surface with a light diffusing finish. For example, a roughened surface. This is provided in order to prevent sunlight or streetlights, for example, from reflecting off the top surface of the visor into the mirror.

Other features and advantages of the present invention will become apparent from the following description of the invention which refers to the accompanying drawing.

DETAILED DESCRIPTION OF THE INVENTION

Referring to the drawings, FIG. 1 shows a mirror 1 mounted on a bus by a series of arms that are mounted to the vehicle body.

Figure 2:
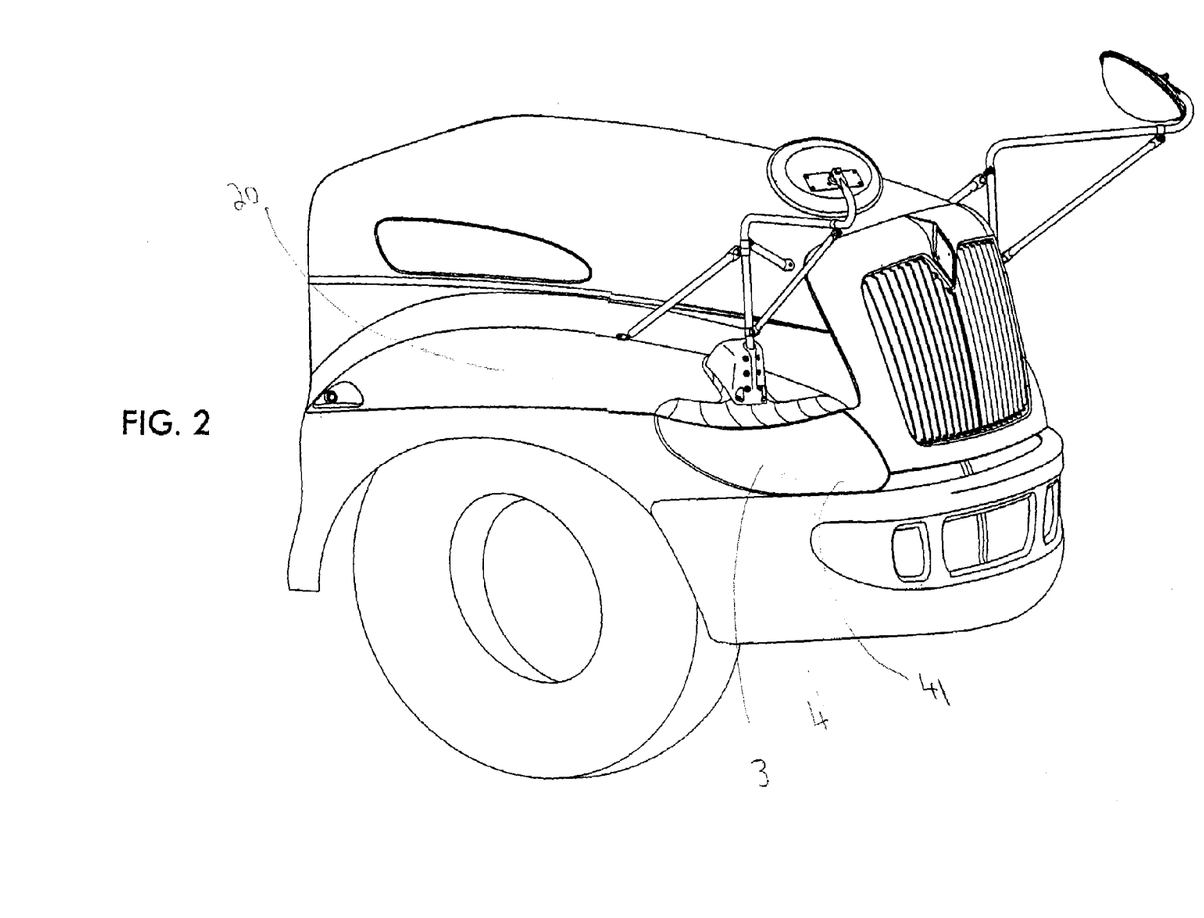
FIG. 2 shows the mirror of FIG. 1 with the inventive visor attached thereto.

FIG. 2 shows a close up of the mirror, mounted on the bus, with the main arm 2 supporting the mirror being attached to the bus fender by a mounting body 3. Attached to the mounting body 3 is a visor 4. The visor 4 has an arrangement of holes which correspond to the mounting holes on the mounting body so that the screws used for mounting the mirror arm to the mounting body also serve to mount the visor 4 to the mounting body 3. The visor 4 is dimensioned and shaped to extend from the mounting body a distance sufficient to at least partially block upwardly directed light from the headlight 5 so that the light is prevented from reaching the mirror 1. The visor 4 can have a variety of different shapes while still providing the intended result of blocking upwardly directed light.

Figure 3:
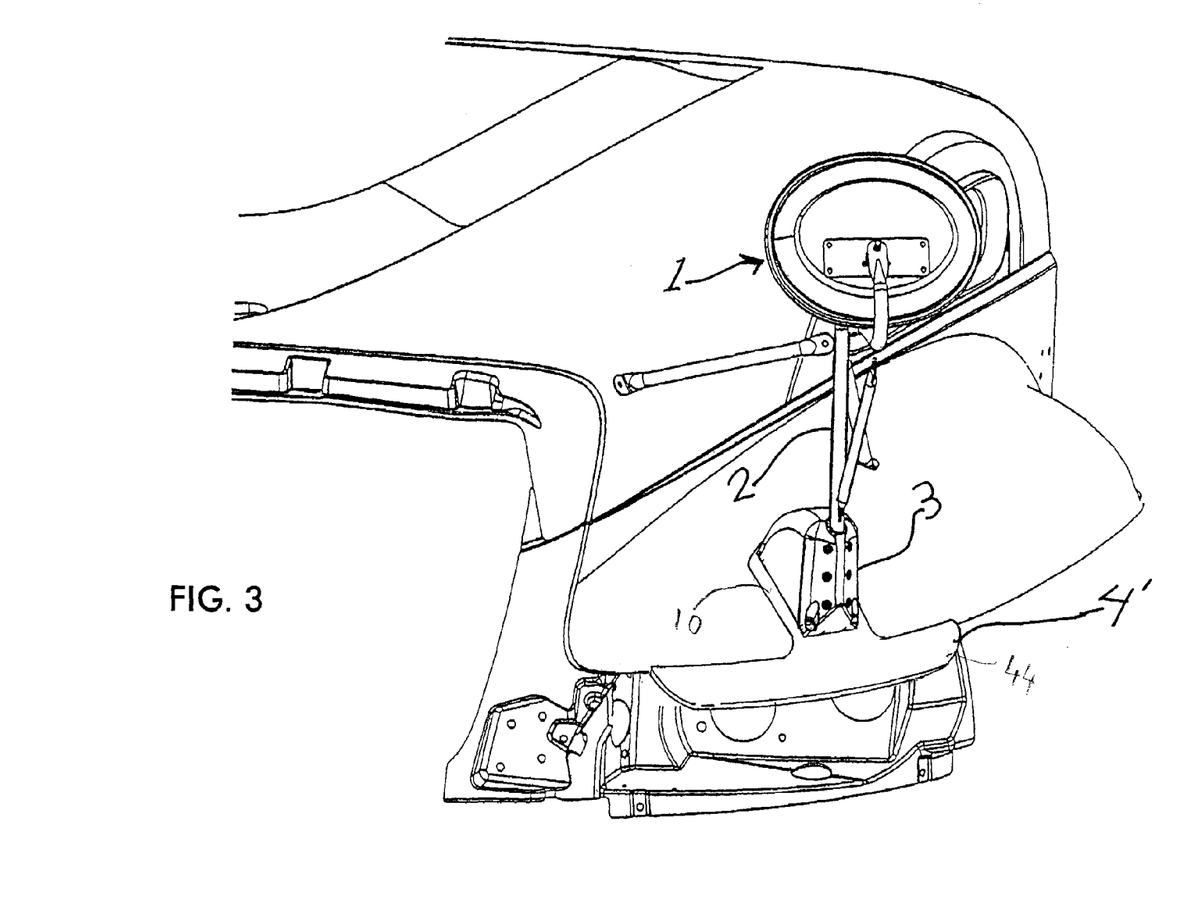
FIG. 3 shows another embodiment of the visor.

FIG. 3 shows a visor 4' that is mounted between the mounting body 3 and the vehicle fender so as to act as a gasket in addition to projecting over the headlight.

Figure 4:
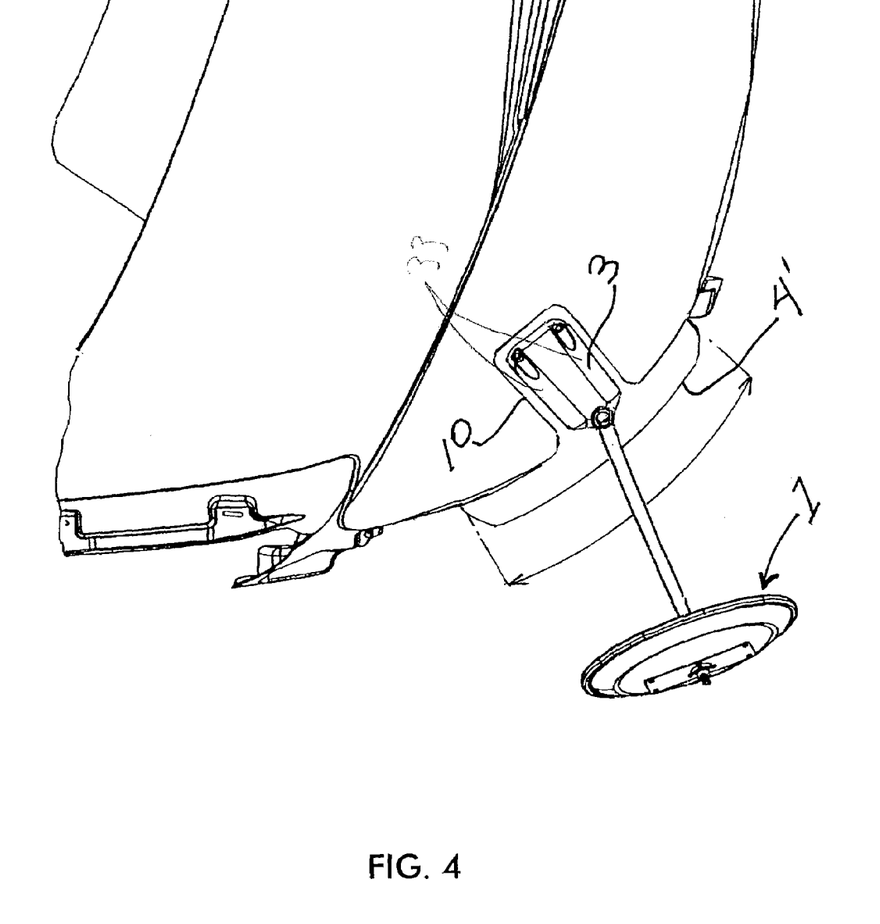
FIG. 4 is a top view of FIG. 3.

FIG. 4 is a top view of FIG. 3 showing the visor 4' projecting away from the fender of the vehicle. As seen in FIG. 4, the visor has a roughly T-shape. The cross-piece of the T has a length L so that the T part covers at least a portion of the headlight of the vehicle. The leg 10 of the T is configured to fit beneath the mounting body 3 and is held in place by the screws which mount the mounting body 3 to the fender.

Figure 5:
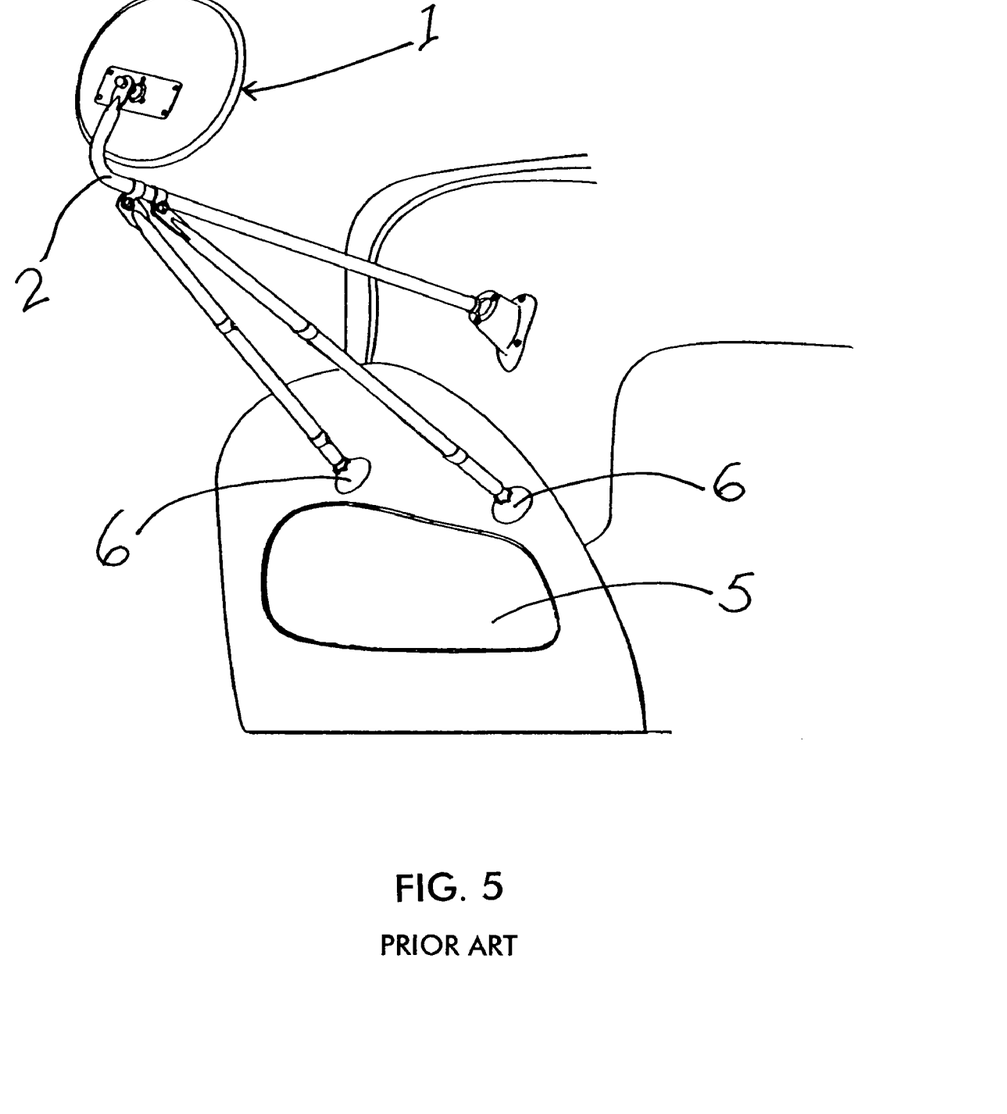
FIG. 5 shows another type of mirror mounted to a bus.
Figure 6:
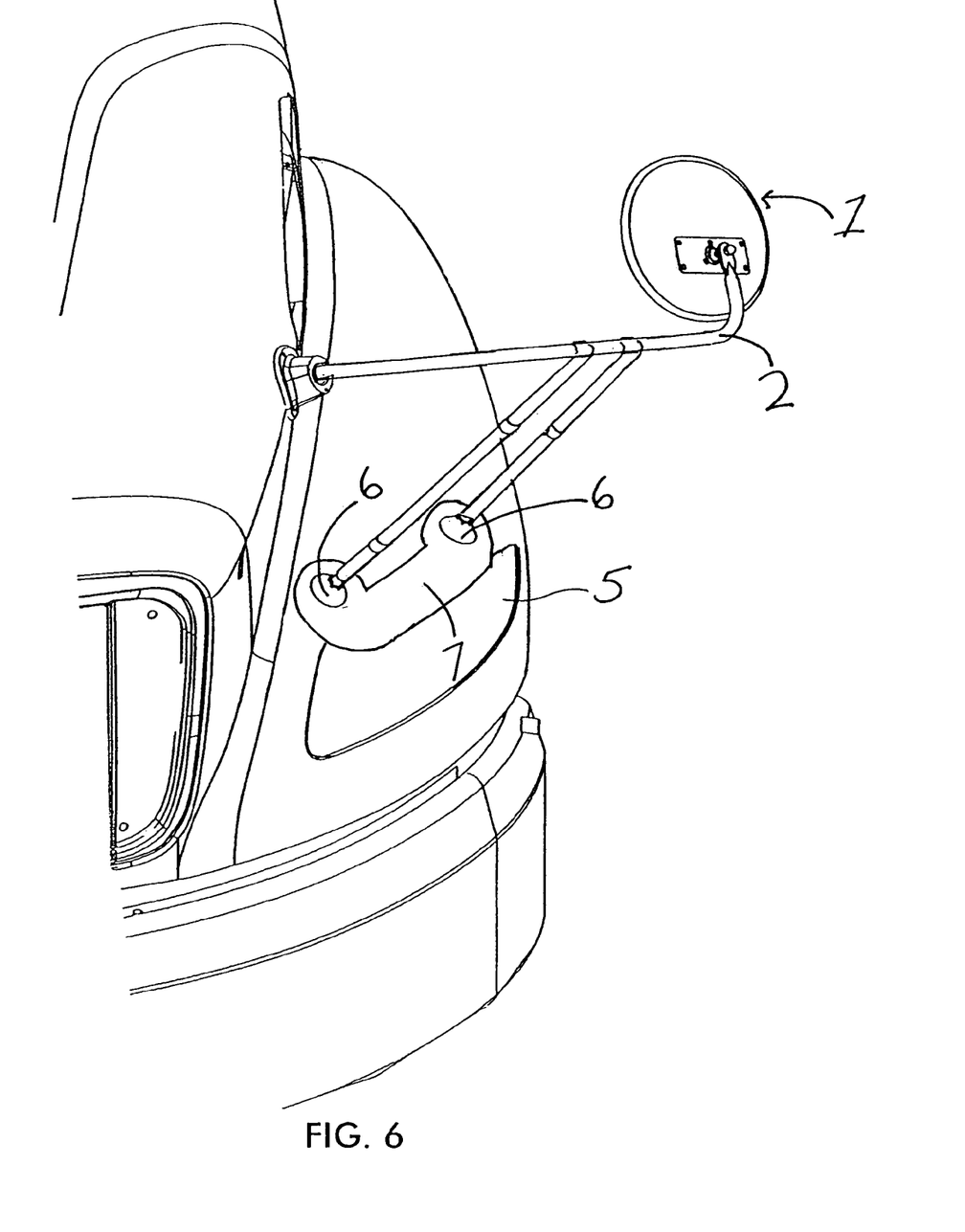
FIG. 6 shows an embodiment of the visor mounted to a mirror as shown in FIG. 5.

Another known type of cross-view mirror is shown in FIG. 5. In this construction, there are three legs that are removably mounted to the fender by supports 6. FIG. 6 shows the visor 7 mounted between the lowermost end of two of the legs of the mirror and the supports 6 for the legs. The visor 7 extends away from the supports 6 so as to project over at least a portion of the headlight 5.

Figure 7:
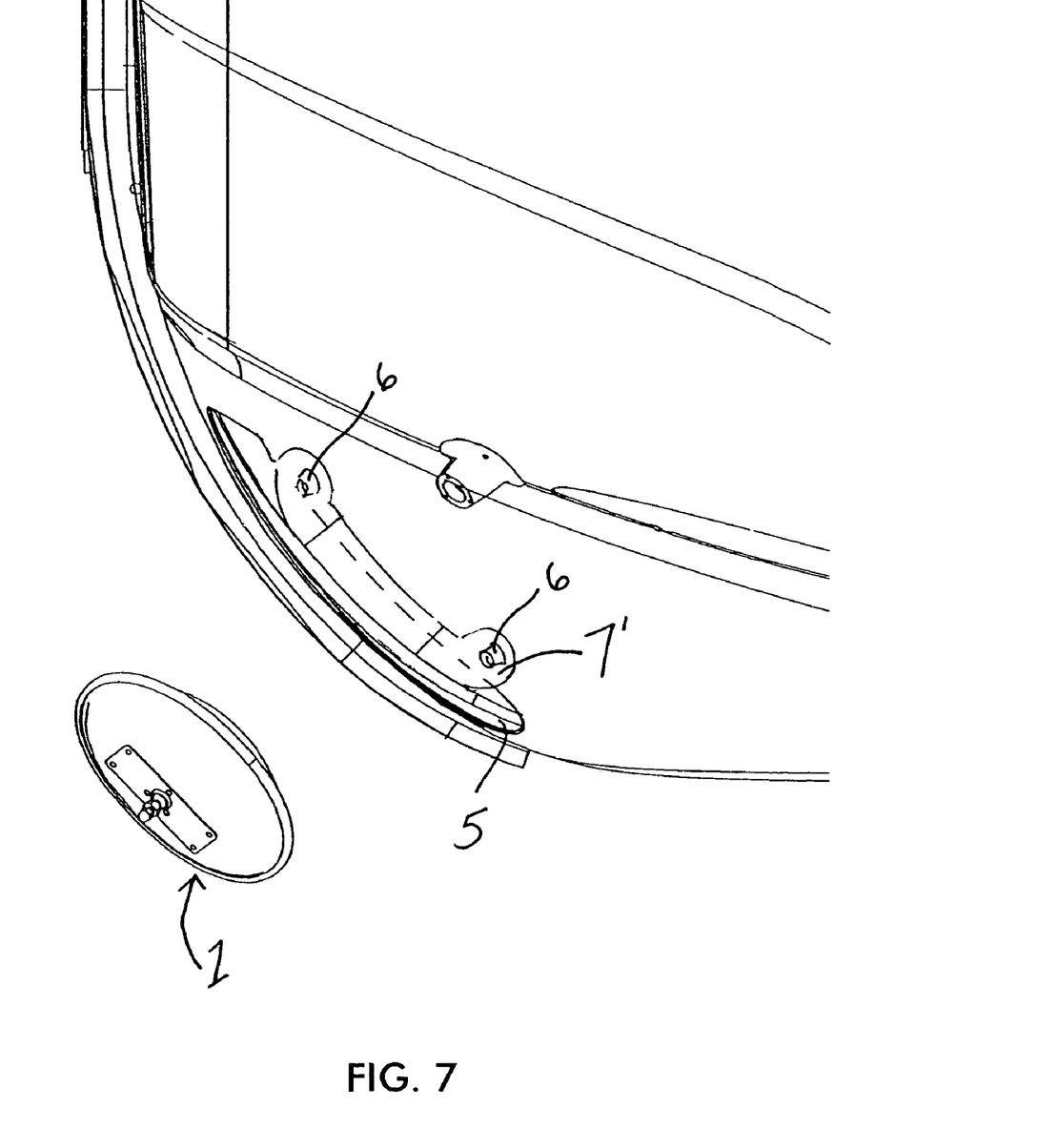
FIG. 7 shows another embodiment of the visor configured for mounting to a mirror as in FIG. 5.
Figure 8:
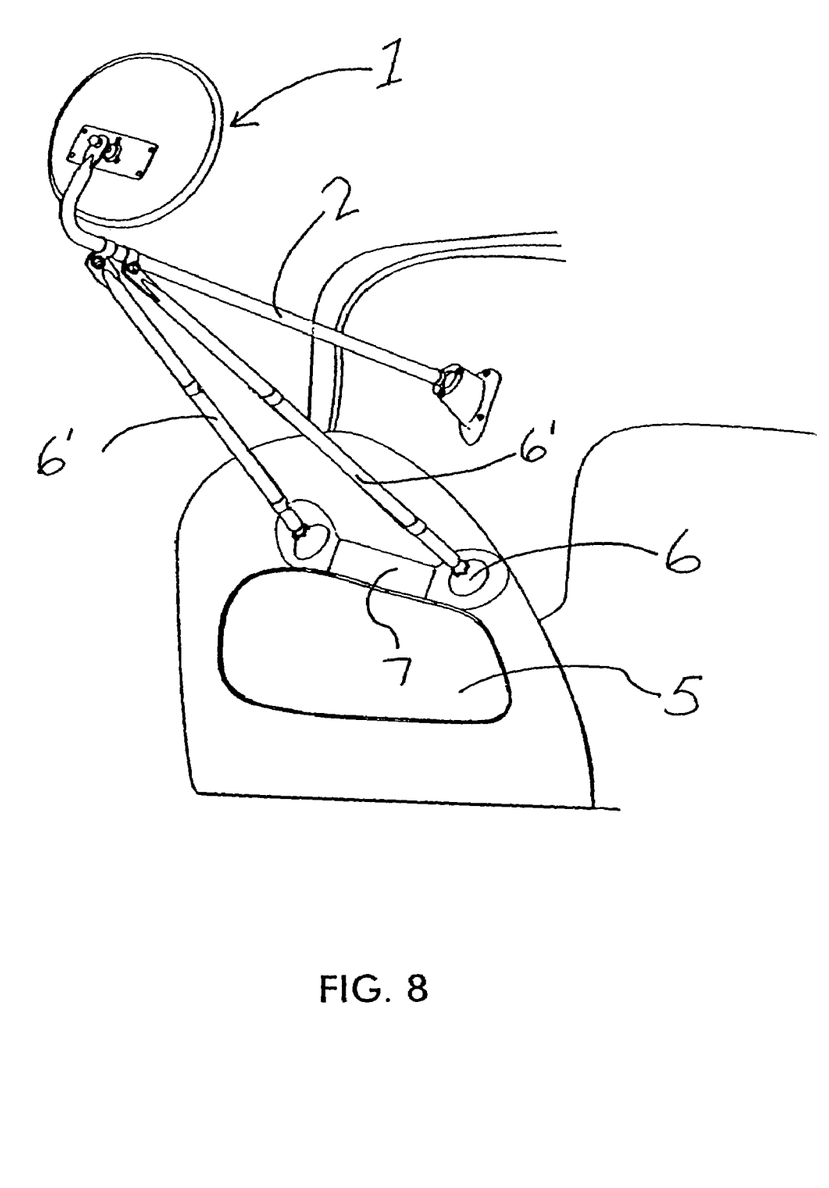
FIG. 8 shows still a further embodiment of the inventive visor.

FIG. 7 shows a top view of a visor 7' of a slightly different shape than the visor in FIG. 6. The legs of the mirror are left out for clarity. The visor 7' is mounted beneath the supports 6. However, it can also be mounted on the supports 6 as the visor 7 in FIG. 6 is. Once the visor 7' is in place, the legs of the mirror and the supports are then mounted. FIG. 8 shows the visor 7' mounted with the mirror. In FIG. 8, the visor 7' may be mounted in a position above the connection points of the leg 6' to the fender body, namely to the leg 6' by the visor 7' having distal ends with perforations which are approximately the same size as the diameter of the leg 6' or by means of sleeves or other simple mechanical fastening structures. In this type of an embodiment, the visor need not be in contact with any portion of the fender as it would be raised an inch or so above the fender surface. The visor may have a front end which is slightly bent inwardly above the lights rather than having a top surface that is flat.

As previously mentioned, the visor can have a length which covers all or only part of the headlight or headlight cluster, the extent of coverage being defined by what is needed to block light from the mirror.

In order to prevent sunlight or light from streetlights from reflecting off the upper surface of the visor into the mirror, the upper surface of the visor has a light diffusing finish. This finish can, for example, be a roughened surface or a matte finish which does not reflect light well.

As has been previously discussed, the visor can be made of any material which will serve to block light and also has the necessary structural characteristics to provide a robust visor that does not break easily and remains in place while the vehicle is being driven. Suitable materials would be plastic or metal, although other materials would also be suitable.

As the various illustrated embodiments show, the visor can have various different shapes. The shapes being defined by how the visor is mounted to the mirror frame, as well as how much of the headlight is intended to be covered to provide the necessary blockage of upwardly directed light. Additionally, the visor can be further shaped for appearance purposes, so long as the light blocking function is fulfilled.

Figure 9:
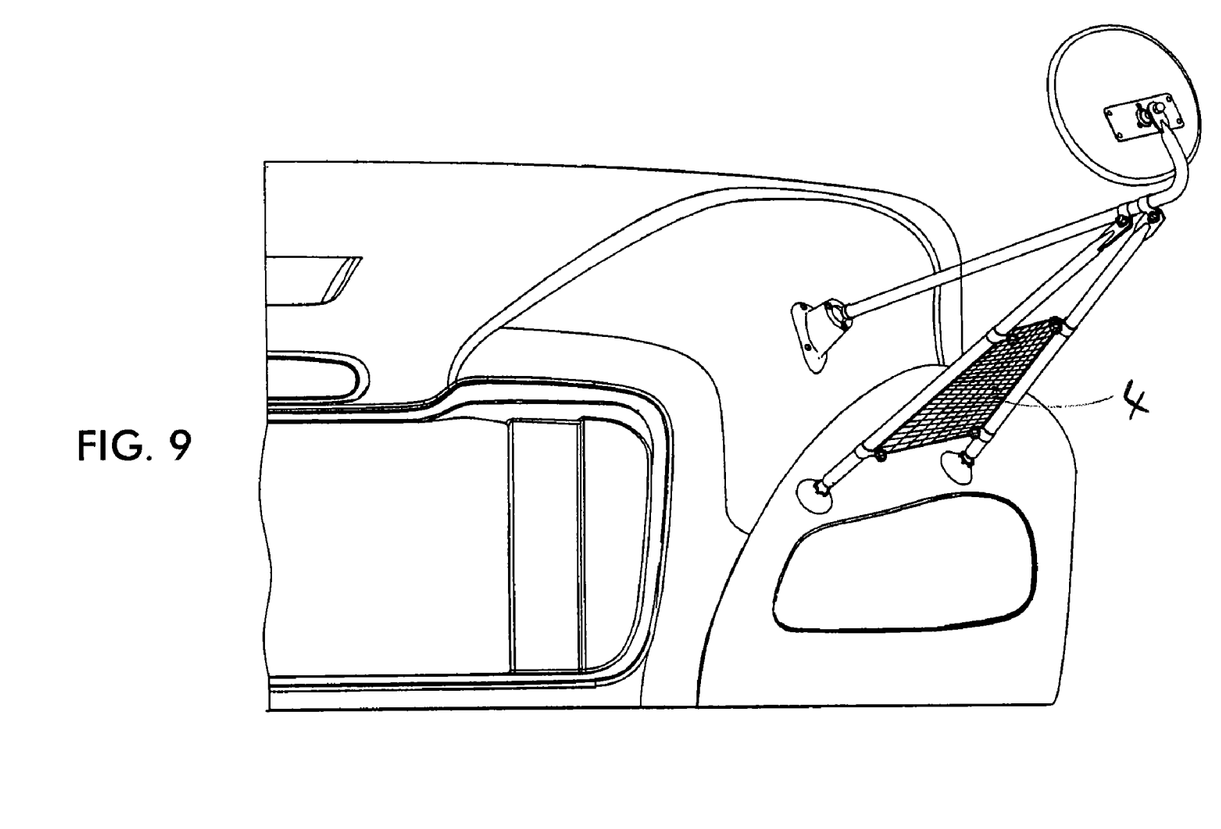
FIG. 9 is a perspective view illustrating a visor comprising a perforated material disposed between two of three legs of the mirror mounting bracketry.

It is also possible to use a perforated material to form the visor, perhaps to reduce weight, air drag and vibrations, so long as the visor blocks sufficient light from the headlamp to reach the mirror. FIG. 9 illustrates a visor made of a perforated or webbing material. The embodiment shown in FIG. 9 illustrates such a visor disposed between two legs of the mirror mounting bracketry, as described above.

A problem with existing headlight shields is an accumulation of snow or debris obstructing the headlamp. By putting in a "step" in the shape of the shield, we allow the debris or snow to pass through and also allow wind to pass through to reduce drag and resistance.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A mirror system for a vehicle, the mirror system comprising:
    a mirror unit supported above a front fender of the vehicle;
    mirror mounting bracketry including a portion directly attached to the vehicle and at least one support arm extending from the mounting bracketry to the mirror unit to support the mirror unit spaced from the front fender;
    a visor provided separately of the directly attached portion of the mounting bracketry, the visor including a first portion located and supported between and by the directly attached portion of the mounting bracketry and the fender, and supported by the mounting bracketry in a manner whereby the visor is located in a position between a headlight of the vehicle and at least a portion of the mirror unit, in a manner which blocks at least a portion of the light from the headlight from striking the mirror unit; and
    the mounting bracketry including a mount housing defining a footprint on the fender of the vehicle and the visor having a mounting portion shaped approximately as the footprint of the mount housing and the mounting portion is located between the fender and the mount housing, the mounting portion comprises a gasket.

2. The mirror system of claim 1, wherein the visor has a fan portion which extends toward the headlight and provides shielding of light emanating from the headlight.

3. The mirror system of claim 2, wherein the at least a portion of the visor which lies between the fender and the mount housing is constructed of a gasket material which is effective to prevent water from penetrating into the mount housing.

4. The mirror system of claim 1, in which the visor has an upper surface which is non-reflecting.

5. The mirror system of claim 1, wherein the visor has a planar section including perforations therein which are of a size that does not substantially pass light from the headlight to the mirror system.

6. A mirror system for a vehicle, the mirror system comprising:
    a mirror unit supported above a front fender of the vehicle;
    mirror mounting bracketry attached to the vehicle and at least one support arm extending from the mounting bracketry to the mirror unit, the at least one support arm adapted to support the mirror unit in space relative to the front fender;
    a visor provided separately of the mounting bracketry and supported by the mounting bracketry in a position between a headlight of the vehicle and at least a portion of the mirror unit, such that the visor prevents at least a portion of the light from the headlight from striking the mirror unit;
    the mounting bracketry comprising at least three legs, each leg of the three legs including a fastener adapted to fasten the leg to the vehicle fender,
    wherein the visor extends between two of the three legs and is secured by the fasteners thereof to the vehicle body.

7. The mirror system of claim 6, wherein the visor has a fan portion adapted to extend toward the headlight and to shield the mirror unit from light emanating directly from the headlight.

8. A mirror system for a vehicle, the mirror system comprising:
    a mirror unit supported above a front fender of the vehicle;
    mirror mounting bracketry attached to the vehicle and at least one support arm extending from the mounting bracketry to the mirror unit, the at least one support arm adapted to support the mirror unit in space relative to the front fender;
    a visor provided separately of the mounting bracketry and supported by the mounting bracketry in a position between a headlight of the vehicle and at least a portion of the mirror unit, such that the visor prevents at least a portion of the light from the headlight from striking the mirror unit;
    the mounting bracketry comprising at least three legs each, each leg of the three legs including a fastener adapted to fasten the leg to the vehicle fender,
    wherein the visor extends between two of the three legs in a position above the fender of the vehicle.

9. The mirror system of claim 8, wherein the visor comprises a webbing portion including perforations of a size that substantially prevent passing of light from the headlight directly to the mirror system.

10. A combination including a mirror system for a vehicle with a visor, the combination comprising:
    a mirror unit supported above a front fender of the vehicle;
    mirror mounting bracketry attached to the vehicle and at least one support arm extending from the mounting bracketry to the mirror unit, the at least one support arm adapted to support the mirror unit in space relative to the front fender; and
    a visor provided separately of the mounting bracketry and secured to and supported by the at least one arm in a position above the mounting bracketry and below the mirror unit, such that the visor prevents at least a portion of the light from the headlight from striking the mirror unit.

11. The combination of claim 10, wherein the visor comprises a webbing portion including perforations of a size that substantially prevent passing of light from the headlight directly to the mirror system.

* * * * *